United States Patent [19]

Steves

[11] 3,762,583

[45] Oct. 2, 1973

[54] LAUNCHING DEVICE FOR BOAT TRAILERS

[76] Inventor: Leon F. Steves, 1181 Meade Ln., Flagstaff, Ariz. 86001

[22] Filed: May 22, 1972

[21] Appl. No.: 255,537

[52] U.S. Cl. .................................. 214/82, 254/95
[51] Int. Cl. ............................................. B60p 3/10
[58] Field of Search ............... 214/82, 510; 254/95; 280/414

[56] References Cited
UNITED STATES PATENTS

| | | | |
|---|---|---|---|
| 1,615,798 | 1/1927 | Cowdrey | 254/95 |
| 3,176,865 | 4/1965 | Faul et al. | 214/505 |
| 3,353,694 | 11/1967 | Mamo | 214/82 |

Primary Examiner—Robert J. Spar
Attorney—Eric P. Schellin et al.

[57] ABSTRACT

This specification discloses a boat trailer together with mechanism for pushing a boat off the trailer for launching purposes. The mechanism consists essentially of a tube comprising three telescopic sections, with the free end of one section carrying a boat engaging bumper. The intermediate section is formed with a rack, and a pinion extends through an opening in the section in which said intermediate section fits, to engage the rack and upon rotation of the pinion under the influence of a crank handle to extend the tube and thus push the boat off the trailer.

4 Claims, 4 Drawing Figures

PATENTED OCT 2 1973 3,762,583

LAUNCHING DEVICE FOR BOAT TRAILERS

The present invention relates to launching devices for boat trailers and is concerned primarily with new and highly simplified mechanism for pushing a boat off of a trailer.

BACKGROUND OF THE INVENTION

At the present time, the practice of transporting small boats on a trailer is becoming more and more widespread. When a boat is to be removed from the water, it is drawn onto a trailer by a winch and cable in accordance with accepted usage. However, when a boat is to be launched from a trailer, somewhat different conditions attend such an operation as compared to that of drawing it onto the trailer. Certain devices have been provided for this purpose, but have been found to be not entirely satisfactory for various reasons.

Some of these devices involve a pulling off of the boat by cables and a winch and results in a somewhat complicated and unwieldy structure in the trailer. Certain types of jacks have also been provided, but it is believed the known devices are both unduly complex and do not operate with the high degree of assurity required of mechanism of this character.

OBJECTS OF THE INVENTION

With the foregoing conditions in mind, the present invention has in view the following objectives:

1. To provide a boat trailer with mechanism for pushing a boat off the trailer and which mechanism includes, as a characteristic and essential element, a sectional telescoping rod and means for extending the rod which operates on the principles of mechanical advantage.

2. To provide, in boat-launching apparatus of the type noted, a sectional telescoping rod having one section formed with a rack, and a pinion extending through an opening in the adjacent section into engagement with said rack, together with a crank handle for rotating the pinion.

3. To provide a boat trailer with the mechanism of the character aforesaid which is also adapted to the mounting of a winch for the purpose of drawing a boat onto a trailer.

Various other more detailed objects and advantages of the invention such as arise in connection with carrying out the above ideas in a practical embodiment will, in part, become apparent and, in part, be hereafter stated as the description of the invention proceeds.

SUMMARY OF THE INVENTION

The foregoing objects are achieved by providing a boat trailer comprising a wheeled chassis, an A-frame extending forwardly and upwardly from the front end of said chassis, a trailer hitch secured to said A-frame at its apex, a bracket upstanding from said A-frame at its apex, a sectional tubular rod comprising three sections, one of which is mounted on the upper end of said bracket, a boat engaging member at the free end of the section remote from that mounted on the bracket, with the intermediate section having a rack formed on the underside thereof, a pinion extending through an opening in the section on the bracket in engagement with said rack, a shaft journalled on said last mentioned bracket, and a crank handle for rotating said shaft.

For a full and more complete understanding of the invention, reference may be had to the following description and the accompanying drawing wherein.

DESCRIPTION OF THE PREFERRED EMBODIMENT

Figure 1:
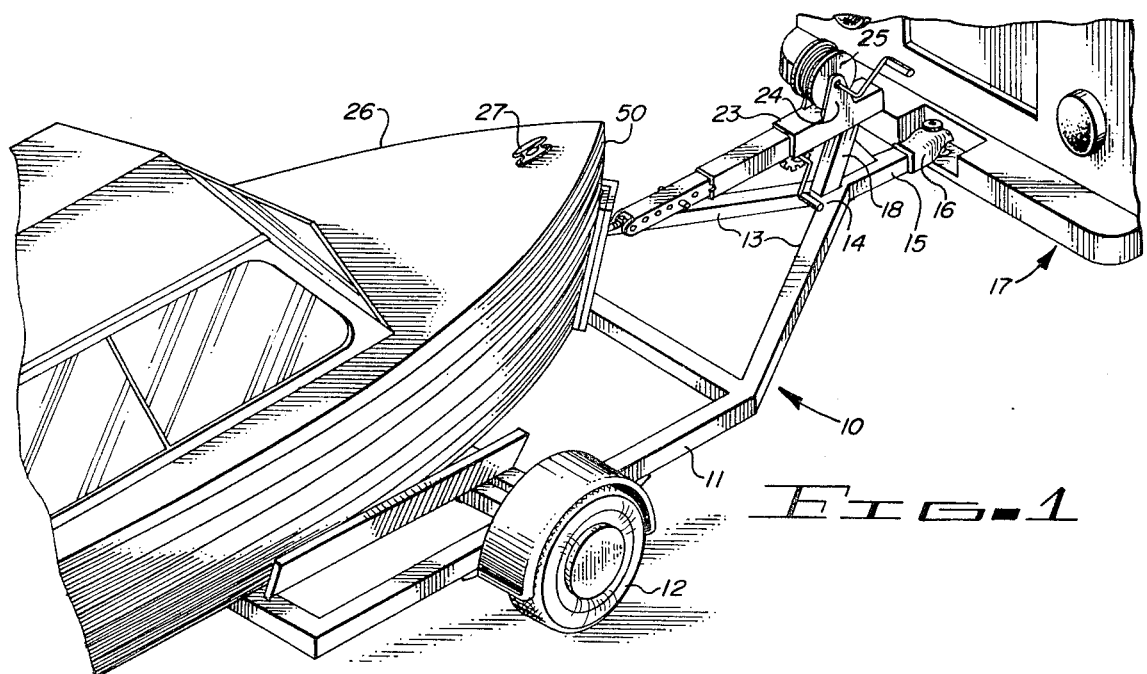
FIG. 1 is a perspective of a boat trailer including a launching device designed in accordance with the precepts of this invention and illustrating the forward end of a boat as it is being launched.

Referring now to the drawing, wherein like references characters denote corresponding parts throughout the several views, and first more particularly to FIG. 1, a boat trailer which is typical of a type which is now meeting with widespread use in connection with small boats is shown at 10. It comprises a chassis 11 on which is mounted a pair of wheels, one of which is shown at 12. Connected to the front end of chassis 11 is an A-frame comprising side members 13 which converge and meet at an apex 14. This A-frame 13 extends forwardly and upwardly from chassis 11. Connected to the A-frame at apex 14 is a bar 15 having a trailer hitch 16 at its free end. Hitch 16 cooperates with an appropriate complemental element on a towing vehicle 17. Upstanding from the apex 14 is a bracket 18.

Figure 2:
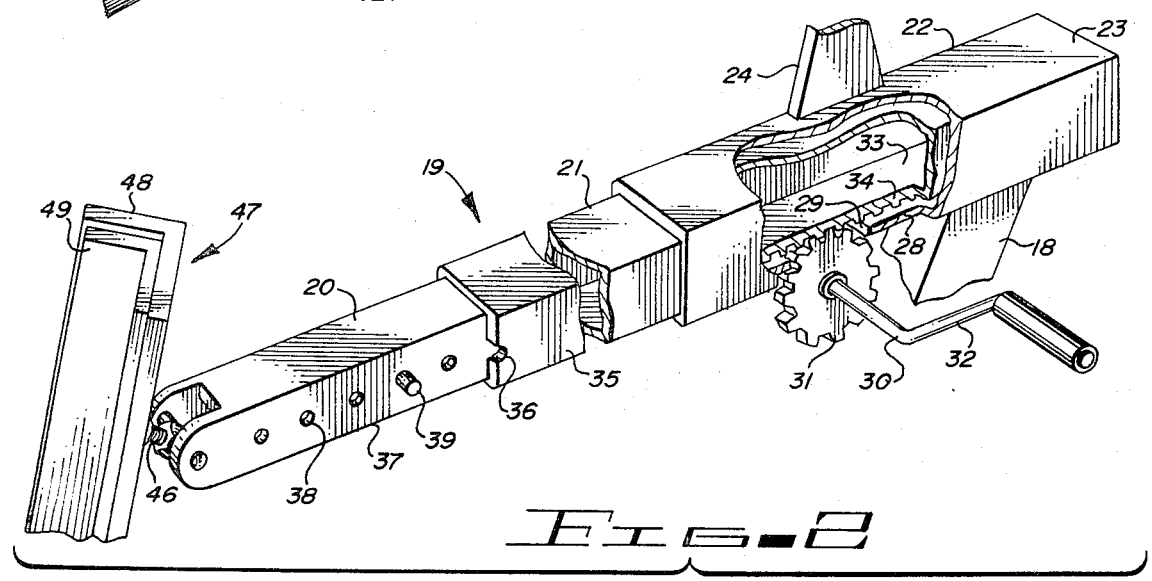
FIG. 2 is a perspective illustrating the launching mechanism on an enlarged scale.
Figure 3:
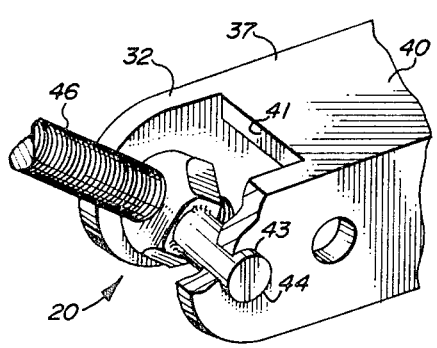
FIG. 3 is a detailed perspective on an enlarged scale and with parts broken away of the connection between the boat engaging member and an end section of the telescoping rod.
Figure 4:
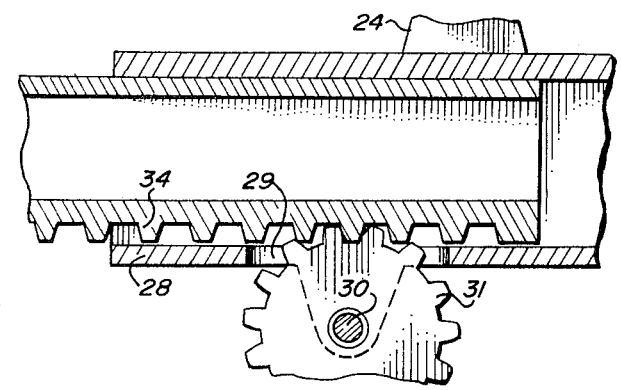
FIG. 4 is a detailed section on an enlarged scale illustrating portions of the sections formed with a rack and the opening for the pinion.

Referring now more particularly to FIG. 2, a telescoping tubular rod is referred to in its entirety by the reference character 19. Rod 19 comprises an end section 20, an intermediate section 21, and another end section 22, which is mounted on the upper end of bracket 18. Section 22 is of square cross-section and presents a top wall 23 to which is secured an ear 24 on which a winch 25 (FIG. 1) is mounted. Winch 25 is provided for the purpose of drawing a boat such as that shown at 26 onto the trailer 10. The cable which is taken up on the winch 25 is not illustrated, but the free end thereof will carry a hook which engages a cleat 27 on boat 26.

End section 22 has a bottom wall 28 formed with an opening 29. A shaft 30 is mounted on the underside of wall 28 and drivably mounted on this shaft 30 is a pinion 31 which extends through opening 29. Shaft 30 is provided with a crank handle 32 for rotating pinion 31.

Intermediate section 21 is slidably received in section 22 with a fair degree of snugness and has a bottom wall 33 which is formed on its external or lower surface with a rack 34. Pinion 31 and rack 34 mesh. Intermediate section 21 is formed with a pair of side walls, one of which is shown at 35, and the end edge of each side wall 35 is formed with a notch 36. End section 20 is slidably received in intermediate section 21 with a fair degree of snugness, and includes a pair of side walls, one of which is shown at 37, and each of which is formed with a series of openings 38. The openings 38 in one side wall align with the openings in the other side wall, and a pin 39 may be passed through any pair of such aligned openings. Pin 39 is received in the notches 36 to limit relative inner or collapsing movement of sections 20 and 21.

End section 20 includes a top wall 40 having an end edge 41. It also includes a bottom wall, not illustrated, which has an end edge in the same relative position as the end edge 41. Side walls 37 are continued beyond these end edges 41 to provide ears 42 having aligned openings 43. A pintle 44 is journalled in the openings 43 and carries a nut 45 which is located between the ears 42. A screw stem 46 is threaded into nut 45.

A boat engaging member designated generally 47 comprises an angle iron 48 secured to the upper end of screw stem 46 and a lining 49 of rubber or a comparable material. The lining 49 is of the same cross-section as angle iron 48. This lining 49 is adapted to engage the prow 50 of boat 26 as shown in FIG. 1.

OPERATION

While the manner of using the subject boat launching apparatus and its mode of operation are believed to be obvious from the illustrations of the drawings and description of parts given, they are briefly described as follows.

When a boat 26 is to be drawn onto trailer 10, the cable which is wound on winch 25 is hooked onto cleat 27 and the winch operated in a conventional manner.

When a boat is to be launched, the cable aforesaid is disconnected. End section 20 is first distended by manual manipulation to bring boat engaging member 47 into engagement with the prow 50. The pin 39 is then placed through the pair of aligned openings 38 which are closest to the end of section 21 so that when intermediate section 21 is extended, the end portions of pin 39 will be received in notches 36. Crank handle 32 is now operated to rotate pinion 31 and extend intermediate section 21 under power. Thus, the boat 26 is launched from trailer 10.

It will be understood that any desired mechanical advantage can be obtained by using a pinion 31 of a required radius and an appropriate length for crank handle 32.

While a preferred specific embodiment is herein disclosed, it is to be clearly understood that the invention is not to be limited to the exact construction, devices and mechanisms illustrated and described because various modifications of these details may be provided in putting the invention into practice.

What is Claimed is:

1. In a boat trailer comprising a wheeled chassis, an A-frame extending forwardly and upwardly from said chassis, a hitch bar having one end connected to said A-frame at its apex and a trailer hitch on the other end of said hitch bar, the improvements comprising:
   a. a bracket upstanding from said A-frame at its apex;
   b. a telescoping tubular rod comprising three sections of square cross-section, there being an end section of maximum cross-section, an intermediate section, and an end section of minimum cross-section;
   c. said end section of maximum cross-section having a top wall and a bottom wall mounted on said bracket;
   d. a opening in said bottom wall;
   e. a shaft rotatably mounted on said bottom wall below said opening;
   f. a pinion drivably mounted on said shaft and extending through said opening;
   g. a crank handle at one end of said shaft for rotating said pinion;
   h. said intermediate section having a bottom wall formed on its outer surface with a rack in engagement with said pinion;
   i. said intermediate section having end edges;
   j. said end section of minimum cross-section being slidably received in said intermediate section at said end edges and having adjustable means for engaging said end edges to limit relative collapsing movement of said end section of minimum cross-section relative to said intermediate section; and
   k. a boat engaging member at the outer of said end section of minimum cross-section.

2. The boat launching apparatus of claim 1 in which said intermediate section includes a pair of end edges in spaced parallel relation and formed with a pair of aligned notches and said adjustable means comprising a pin received in any of a pair of aligned openings in said end section of minimum cross-section.

3. The boat launching apparatus of claim 1 together with a winch mounted on the top wall of said end section of maximum cross-section.

4. The boat launching apparatus of claim 1 in which said boat engaging member is pivotally mounted on said end section of minimum cross-section.

* * * * *